United States Patent [19]

Hess et al.

[11] Patent Number: 4,478,099

[45] Date of Patent: Oct. 23, 1984

[54] DRIVING GEAR

[75] Inventors: Peter Hess, Coburg; Gunter Mühling, Grub a. Forst; Gerhard Schust, Weidhausen, all of Fed. Rep. of Germany

[73] Assignee: Metallwerk Max Brose GmbH & Co.

[21] Appl. No.: 219,944

[22] Filed: Dec. 23, 1980

[30] Foreign Application Priority Data

Jan. 4, 1980 [DE] Fed. Rep. of Germany ....... 3000199

[51] Int. Cl.[3] ....... F16H 37/00

[52] U.S. Cl. ....... 74/11; 74/505; 185/37; 185/39

[58] Field of Search ....... 74/11, 505; 185/37, 185/39, 45; 49/139, 140, 348, 349

[56] References Cited

U.S. PATENT DOCUMENTS

| | | | |
|---|---|---|---|
| 1,560,991 | 11/1925 | Heintz | 185/45 |
| 2,429,313 | 10/1947 | Gilbert | 185/37 |
| 3,049,317 | 8/1962 | Kessler | 185/45 |
| 3,122,351 | 2/1964 | Brown | 185/45 |
| 3,735,840 | 5/1973 | Sheperd | 185/39 |
| 4,085,629 | 4/1978 | Fogarollo | 49/140 |
| 4,314,692 | 2/1982 | Brauer et al. | 49/349 |

FOREIGN PATENT DOCUMENTS

| | | | |
|---|---|---|---|
| 774458 | 12/1967 | Canada | 49/348 |
| 1244609 | 7/1967 | Fed. Rep. of Germany | 49/349 |
| 2743982 | 4/1979 | Fed. Rep. of Germany | 49/139 |

*Primary Examiner*—John E. Murtagh
*Assistant Examiner*—Andrew Joseph Rudy
*Attorney, Agent, or Firm*—Toren, McGeady and Stanger

[57] ABSTRACT

In a driving gear, a wheel is mounted on a supporting plate. The wheel has a rim with teeth on its inside surface and a pinion mounted on the supporting plate is in meshed engagement with the teeth. A housing, attached to the supporting plate, encloses the wheel. Entrainment surfaces on the outside circumference of the wheel engage an elongated power take-off member supported within and extending through the housing.

17 Claims, 8 Drawing Figures

Figure 1:
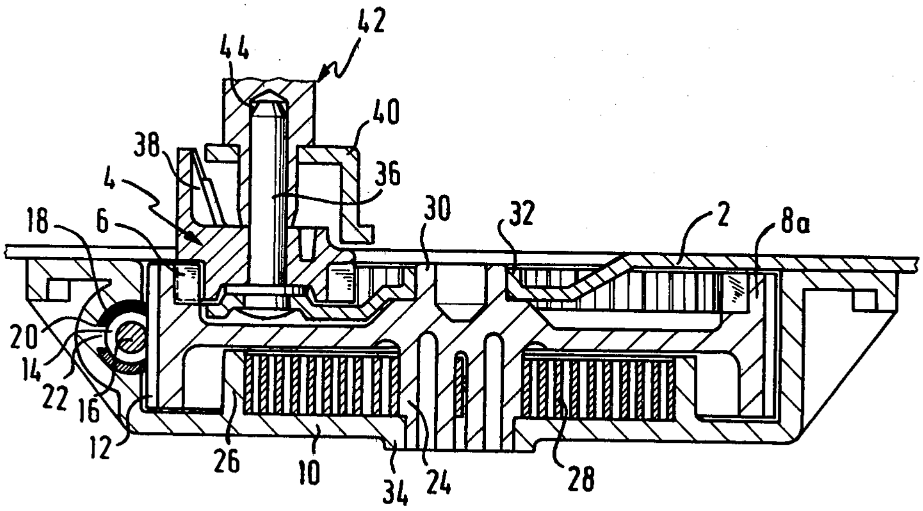

FIG.3
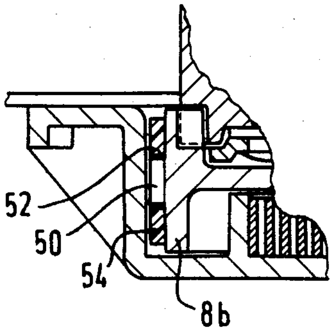
FIG.4
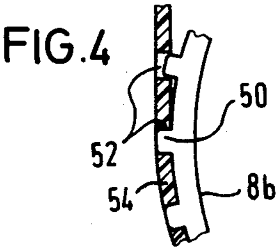
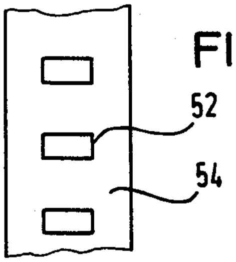
FIG.5

FIG. 6
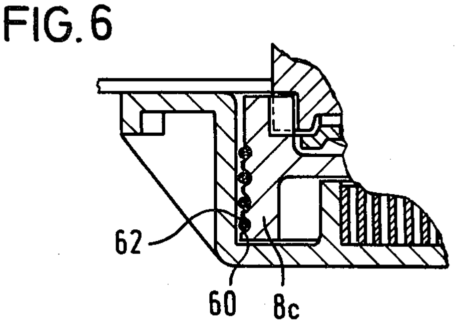
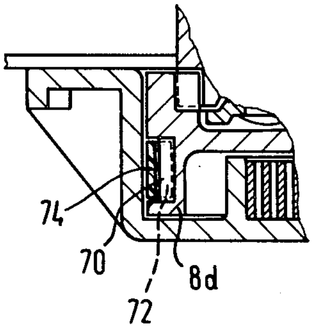
FIG. 7
FIG. 8
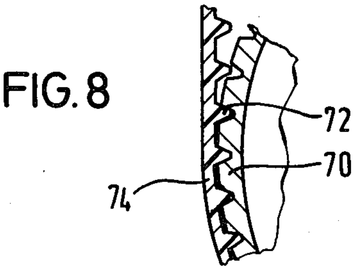

DRIVING GEAR

The invention relates to a driving gear according to West German Offenlegungsschrift No. 25 24 583 with a driveable pinion, mounted on a supporting plate, which pinion meshes with the inner toothing of a wheel which is also mounted on the supporting plate.

In the device according to the West German Offenlegungsschrift No. 25 24 583, a lifting arm for a window, in particular for a motor vehicle window, is adjusted by means of the wheel.

At the basis of the invention there is the task of expanding the field of application of this driving gear by means of constructional changes.

For the solution of this task, the driving gear is characterized in that the wheel is enclosed by a housing attached to the supporting plate and in that the peripheral surface of the wheel is provided with entrainment surfaces for an elongated power take-off member traversing the housing and propped against the inner surface of the housing.

The invention makes it possible to drive a large number of different longitudinally extended power take-off members with the driving gear.

For the purpose of being able to support the driving gear with spring tension, it is preferably characterized in that the wheel, on its side facing away from the supporting plate, is provided with a hub which is encircled concentrically, at an interval, by a ring flange located on the inner side of the housing, and in that there are attached to the hub and to the ring flange the ends of a spiral spring.

As power take-off member there can be provided a cable which is stiff in regard to tension and compression, which cable, with a screw thread located on its outer side, meshes with an outer toothing of the wheel. For the protection of this cable there is led, preferably through the housing, a pipe enveloping the cable away from the area of the outer toothing of the wheel. This pipe is preferably secured in the housing in a form-locking manner against displacement and turning.

In another preferred embodiment, there is provided as power take-off member a belt which is stiff in regard to tension and pressure, in which belt there are holes with which the teeth of the wheel mesh. The belt is preferably made of plastic, in particular a polyester-elastomer, or of steel.

In another preferred embodiment, the power take-off member consists of a rope embedded in grooves extending in the peripheral direction of the wheel.

In a further preferred embodiment, the power take-off member consists of a flexible toothed rack which is stiff in regard to tension and compression, which toothed rack meshes with the teeth of the wheel. This toothed rack can also be made of plastic or steel.

The wheel and the housing can be made of plastic, particularly POM (tradename Delrin 100) or of die-cast metal, in particular die-cast aluminum or die-cast zinc.

The housing serves preferably to seal off the gear assembly as well as a spiral spring located inside the gear assembly and functioning as a weight-equalizing spring, against external influences, for instance the washing away of grease. The spring can be greased after assembly through bore holes provided in a cover of the housing. Furthermore, water run-off holes can be provided in the housing.

The invention is elucidated below with the help of embodiment examples with reference to the accompanying drawings.

Figure 2:
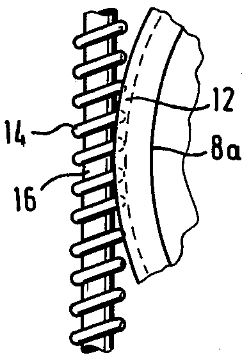

FIG. 1 shows a first embodiment of the device with a cable, which is stiff in regard to tension and compression, as the elongated power take-off member, in longitudinal section, FIG. 2 shows the interaction of the cable according to FIG. 1 with the wheel, FIG. 3 shows a part of the device according to FIG. 1 with the difference that a holed belt, which is stiff in regard to tension and compression, is provided as the elongated power take-off member, FIG. 4 shows the interaction of the holed belt with the wheel, FIG. 5 shows a view of a segment of the holed belt, FIG. 6 shows an embodiment of the device according to FIG. 1 with a rope as the elongated power take-off member, FIG. 7 shows an embodiment of the device according to FIG. 1 for a flexible toothed rack, which is stiff in regard to tension and compression, as the elongated power take-off member, and FIG. 8 shows the interaction of toothed rack and wheel.

The driving gear according to FIG. 1 presents a pinion 4 mounted onto a supporting plate 2, which pinion meshes with an inner toothing 6 of a sheel 8*a* which wheel is also mounted on the supporting plate 2. The wheel 8*a* is enclosed by a housing 10 fastened to the supporting plate 2. The outer circumferential periphery of the wheel 8*a* is spaced closely inwardly from the housing 10. The outer circumferential peripheral surface of the wheel 8*a* is provided with teeth 12 forming entrainment surfaces. The teeth 12 mesh with a screw cable is stiff in regard to tension and compression. The cable 16 forms an elongated power 9 take-off member. Through cable is stiff in regard to tension and compression. Through the housing 10 there is led a pipe 18 which envelops the cable 16 away from the area of the outer toothing 12 of the wheel 8*a*. The pipe 18 presents a perforation 20, into which a projection 22 of the housing 10 engages. In this way the pipe 18 is secured in a form-locking way in the housing 10 against displacement and turning. As can be seen in FIG. 1 the outer surface of the screw thread 14 on the cable 16 is supported against the inside surface of the housing opposite the location where the cable 16 or power take-off member is in engagement with the entrainment surfaces 12.

Wheel 8*a* has a first side facing toward the supporting plate 2 and a second side facing away from the supporting plate. The wheel 8*a* presents a hub 24 on its second side facing away from the supporting plate 2, which hub is encircled concentrically at an interval or radially extending space, by a ring flange 26 located on the inner side of the housing 10. To the hub 24 and the ring flange 26, there are fastened the ends of a spiral spring 28.

The wheel 8*a* is mounted in the supporting plate 2 by means of a hub-shaped attachment 30, which is enclosed by a collar 32 of the supporting plate. The hub 24 is mounted in a similar bearing collar 34 of the housing 10.

The pinion 4 is turnably mounted onto a pinion pin 36 riveted to the supporting plate 2. The pinion has a claw 38 which is connected via a brake spring, not represented here, with a claw 40 on a crank bolt 42. The two claws 38, 40 form, in conjunction with the brake spring which is not represented, a loop spring brake. The crank bolt 42 has a blind-end bore 44 into which the pin 36 engages as bearing axle. Details concerning the loop spring brake are described in the main application.

The device according to FIG. 3 corresponds to that according to FIG. 1, with, however, the wheel 8*b* being fitted at its periphery with the teeth 50 or entrainment surfaces which mesh with the holes 52 of a holed belt 54 or power take-off member (cf. FIG. 4 and FIG. 5).

The embodiment according to FIG. 6 corresponds, in turn, to that of FIG. 1, but there are however provided in the outer circumferential periphery of the wheel 8*c* grooves or entrainment surfaces 60 into which is embedded a rope or power take-off member 62.

The embodiment according to FIG. 7 also corresponds to that of FIG. 1, but there are provided on the outer periphery of the wheel 8*d* teeth or entrainment surfaces 70 which engage in a form-locking manner with teeth 72 in a flexible toothed rack or power take-off member 74 which is stiff in regard to tension and compression (see FIG. 8).

We claim:

1. Driving gear comprising a supporting plate, a wheel rotatably mounted on said supporting plate, said wheel having a rim thereon with teeth formed in the inwardly facing surface of said rim, a drivable pinion mounted on said supporting plate with said pinion disposed in meshed engagement with said teeth formed in said wheel, wherein the improvement comprises a housing enclosing said wheel, said housing attached to said supporting plate, entrainment surfaces on the outer circumferential periphery of said wheel spaced closely inwardly from said housing, and an elongated power take-off member extending into said housing and disposed within said housing in engagement with said entrainment surfaces with said power take-off member supported against said housing opposite the location where said power take-off member is in engagment with said entrainment surfaces.

2. Driving gear, as set forth in claim 1, wherein said wheel having a first side facing toward said supporting plate and a second side facing away from said supporting plate, a hub secured to and extending outwardly from the second side of said wheel, said housing having a ring flange extending inwardly therefrom and disposed concentrically about and spaced radially outwardly from said hub, said hub and said ring flange defining a space therebetween, and a spiral spring having one end connected to said hub and the other end conncted to said ring flange with said spiral spring encircling said hub in the space between said hub and said ring flange.

3. Driving gear, as set forth in claim 2, wherein said power take-off member comprises a cable which is stiff in tension and compression, said cable having a screw thread formed on the outside surface thereof with said screw thread disposed in meshed engagement with said entrainment surfaces of said wheel.

4. Driving gear, as set forth in claim 3, wherein a pipe located within and extending through said housing and enclosing said cable with said pipe being open for affording meshed engagement between said cable and said entrainment surfaces.

5. Driving gear, as set forth in claim 4, wherein means in said housing for securing said pipe therein in a form-locking manner for holding said pipe against rotation and axial displacement.

6. Driving gear, as set forth in claim 1, wherein said power take-off member comprises a belt stiff in tension and compression, said belt having holes therein, said entrainment surfaces comprising teeth engageable within the holes in said belt.

7. Driving gear, as set forth in claim 1, wherein said power take-off member comprises a rope, said entrainment surfaces comprise grooves extending in the circumferential direction in the circumferential periphery of said wheel, and said rope embedded in said grooves in said wheel.

8. Driving gear, as set forth in claim 1, wherein said power take-off member comprises a flexible toothed rack which is stiff in tension and compression, said entrainment surfaces comprise teeth formed in the circumferential periphery of said wheel with said teeth in the circumferential periphery of said wheel being in meshed engagement with said flexible toothed rack.

9. Driving gear, as set forth in claim 2, wherein said housing having a bore therethrough connected to the space containing said spiral spring for greasing said spiral spring.

10. Driving gear, as set forth in claim 3, wherein said power take-off member comprises a cable which is stiff in tension and compression, said cable having a screw thread formed on the outside surface thereof with said screw thread disposed in meshed engagement with said entrainment surfaces on said wheel.

11. Driving gear, as set forth in claim 2, wherein said power take-off member comprises a belt stiff in tension and compression, said belt having holes therein, said entrainment surfaces comprising teeth engageable within the holes in said belt.

12. Driving gear, as set forth in claim 3, wherein said power take-off member comprises a rope, said entrainment surfaces comprise grooves extending in the circumferential direction in the circumferential periphery of said wheel, and said rope embedded in said grooves in said wheel.

13. Driving gear, as set forth in claim 2, wherein said power take-off member comprises a flexible toothed rack which is stiff in tension and compression, said entrainment surfaces comprise teeth formed in the circumferential periphery of said wheel with said teeth in the circumferential periphery of said wheel being in meshed engagement with said flexible toothed rack.

14. Driving gear, as set forth in claim 1, 2, 4, 5, 6, 7, 8, 10, 11, 12 or 13 wherein said housing being tightly connected to said supporting plate.

15. Driving gear, as set forth in claim 1, 2, 4, 5, 6, 7, 8, 10, 11, 12 or 13, wherein said housing having water run-off holes therein.

16. Driving gear, as set forth in claim 1, 4, 5, 6 7, 8, 10, 11, 12 or 13 wherein said wheel having a first side facing toward said supporting plate and a second side facing away from said supporting plate, a hub secured to and extending outwardly from the second side of said wheel, said housing having a ring flange extending inwardly therefrom and disposed concentrically about and spaced radially outwardly from said hub, said hub and said ring flange defining a space therebetween, a spiral spring having one end connected to said hub and the other end connected to said ring flange with said spiral spring encircling said hub in the space between said hub and said ring flange, and said housing having a bore therethrough connected to the space containing said spiral spring for greasing said spiral spring.

17. Driving gear comprising a supporting plate (2) having a first side and a second side, a pinion (4) rotatably supported on the first side of said supporting plate, a wheel (8*a*) supported on the second side of said supporting plate, said wheel includes a hub (24) on the side thereof facing away from said supporting plate, a housing (10) including said wheel and attached to said supporting plate, said wheel has radially inwardly directed toothing (6) thereon in meshed engagement with said pinion, said housing has an annular flange (26) on the inside of said housing directed toward said wheel and laterally enclosing said hub with said flange spaced radially outwardly from said hub, a spiral spring located within the space between said hub and said flange with one end of said spiral spring attached to said hub and the other end attached to said flange, said wheel (8, 8*a*, 8*b*, 8*c*) has entrainment surfaces (12, 50, 60, 70) on the circumferential periphery thereof, and an elongated drive member (16, 54, 62, 74) extending through said housing into engagement with said entrainment surfaces and supported by the inside surface of said housing opposite the location of engagement with said entrainment surfaces.

* * * * *